Oct. 31, 1961 W. R. HUGHES 3,006,549
DIGITAL DIVIDER
Filed Sept. 30, 1957
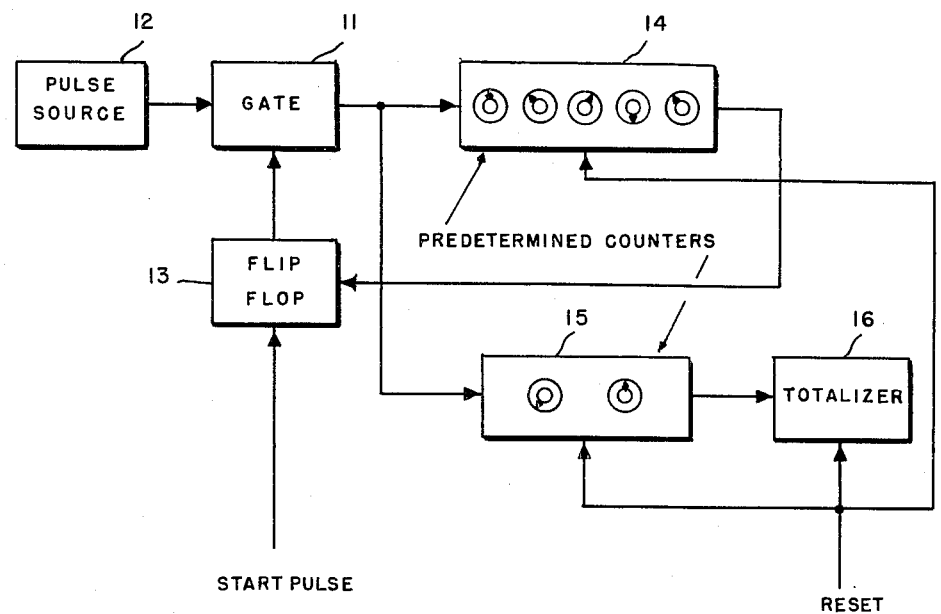
PREDETERMINED COUNTERS
START PULSE
RESET
*INVENTOR,*
WILLIAM R. HUGHES
*BY*
Harry M. Saragovitz
ATTORNEY 3,006,549
DIGITAL DIVIDER
William R. Hughes, Sylmar, Calif., assignor to the United States of America as represented by the Secretary of the Army
Filed Sept. 30, 1957, Ser. No. 687,314
5 Claims. (Cl. 235—160)

The present invention relates to a digital divider. An object thereof is to provide a novel and simple means for division by electronic techniques.

Briefly, the present invention comprises a pulse source connected to the input of a first presettable predetermined counter through a gate circuit, a pulse totalizer connected to the output of the first counter, a means to open the gate circuit to permit feeding of pulses from the pulse source to the counter, and at least a second presettable predetermined counter to control the closing of the gate circuit. The pulses, being fed to the input of the first counter are simultaneously fed to the input of the second counter. The output of this second counter is fed to the gate circuit. Thus, when the second counter is preset to the number to be divided, i.e., the dividend, the gate will be closed after the number of pulses equal to the dividend have passed therethrough. The pulses passing through the gate are simultaneously applied to the first counter, which is preset to the divisor (the number to divide by), where they are divided and applied to the totalizer. Therefore, the pulse totalizer will indicate the quotient by counting the number of pulses applied thereto before the closing of the gate.

The exact nature of this invention as well as other objects and advantages thereof will be apparent from the following specification taken in connection with the annexed drawing which depicts in block diagram form a preferred embodiment of the invention.

Referring now to the drawing, there is shown a gate circuit 11 having pulse source 12 and flip-flop circuit 13 electrically connected thereto. Flip-flop circuit 13, which is a bistable multivibrator, has a start pulse initiating means electrically connected therewith for triggering flip-flop circuit 13 and setting it to the stable state in which it holds open the gate circuit 11. Second presettable predetermined counter 14 is electrically connected between gate circuit 11 and flip-flop circuit 13 so as to receive, at its input, pulses from pulse source 12 when gate circuit 11 is open and so operates that when a given number of pulses, as determined by its setting, are applied to its input a single pulse is derived at its output. This pulse is applied to, and changes the state of, flip-flop circuit 13 to the "off" state, in which it closes gate circuit 11 and allows no more pulses to pass therethrough.

A first predetermined counter 15 is electrically connected to the output of gate circuit 11 to simultaneously receive the same information received by the second counter 14 from pulse source 12. The output of the first counter 15 is applied to pulse totalizer 16 wherein the total number of pulses applied thereto are counted.

A manually controlled reset circuit is electrically connected to and is used to apply a reset pulse to counters 14 and 15 and totalizer 16 to set them to zero count condition.

A predetermined counter is essentially an adjustable frequency divider which can be preset to yield a single output pulse in response to any desired number of input pulses within the capacity of the counter. Examples of such counters are described in U.S. Patent 2,669,388, issued February 16, 1954 to B. Fox, and in U.S. Patent 2,574,283, issued November 6, 1951 to J. T. Potter.

The division system operates as follows: a pulse applied to the reset circuit, resets presettable predetermined counters 14 and 15 and totalizer 16 to zero count condition.

If it is desired to divide X (dividend) by Y (divisor), counters 14 and 15 are preset to X and Y respectively.

A start pulse, applied to flip-flop circuit 13, opens gate circuit 11 and allows pulse source 12 to apply its output simultaneously to counters 14 and 15. Since counter 14 behaves as a divider and is preset to dividend X, the output therefrom will be a single pulse after X pulses have been applied thereto. This single output pulse is applied to flip-flop circuit 13 which changes its state to "off" condition and closes gate circuit 11, thereby allowing no more pulses to pass therethrough to counters 14 and 15.

These X pulses, as applied to counter 15, are divided by the preset divisor Y, whereby a single pulse is derived at its output for every Y pulse applied thereto. Thus, $X/Y$ pulses will be applied therefrom to totalizer 16 where the quotient will be indicated.

For example, if it is desired to divide 1000 by 5, counters 14 and 15, and totalizer 16 will first all be reset to zero count position by a reset pulse. Then counter 14 would be set to 1000 and counter 15 would be preset to 5. When 1000 pulses are applied to counter 14, a single output pulse will be applied therefrom to flip-flop circuit 13, thereby closing gate 11 and allowing no more pulses to pass therethrough. Counter 15 delivers a single pulse for every 5 pulses applied thereto. Thus, when 1000 pulses are applied simultaneously to counters 14 and 15, gate 11 allows no more pulses to pass therethrough and counter 15 will have as an output 1000/5 or 200 pulses. Thus totalizer 16 will indicate the quotient of 200.

In summary, it can be said that counter 14, by controlling gate 11, allows a number of pulses equal to the dividend to be applied to counter 15 and counter 15 divides this number of pulses by the divisor so that the output therefrom as applied to and indicated by the totalizer will be equal to the quotient.

If it is desired to divide the quotient still further, another presettable predetermined counter can be inserted between counter 15 and totalizer 16. Thus, if N presettable predetermined counters are used, the original number can be divided by N preset numbers.

It should be noted that the repetition rate or uniformity of the output of the pulse source do not affect the operation of the invention. They will merely determine the speed of operation.

With the system described the totalizer will show the exact quotient only when the divisor is an integral multiple of the dividend. If this is not so, the error may be relatively large where the quotient is small. To overcome this, the number inserted into counter 14 may be made equal to the dividend multiplied by $10^n$, where $n$ is determined by the degree of accuracy desired. The quotient indicated on the totalizer is then divided by $10^n$ to give the true quotient. Thus, if 98 is to be divided by 8, then counter 14 will be preset to the number $98 \times 10^2 = 9800$. The quotient indicated by totalizer 16 will then be $9800/8 = 1225$. Dividing this number by $10^2$ will yield the true quotient 12.25.

The foregoing disclosure relates to only a preferred embodiment of the invention. Numerous modifications or alterations may be made therein without departing from the spirit and the scope of the invention as set forth in the appended claims.

What is claimed is:

1. A system for dividing a first number by a second number comprising a source of pulses, a first presettable predetermined counter preset to said second number and coupled to said source through a gate, a pulse totalizer connected to the output of said first counter to count the pulses therefrom, means to open said gate to permit feeding pulses from said source to said first counter, and means to close said gate, the last-named means comprising a second presettable predetermined counter set to said first number and connected to the output of said gate, means feeding pulses from said junction of the output of said gate and the input of said first counter simultaneously to the inputs of said counters, means feeding a gate closing pulse from the output of said second counter to said gate, whereby said gate will be closed when a total number of pulses equal to said first number passes therethrough and said first counter will divide said number by said second number so that the pulses applied to and indicated on said totalizer will be equal to the quotient of said first number divided by said second number.

2. A system set forth in claim 1, wherein said means to open said gate and said means for feeding a gate closing pulse comprises a flip-flop circuit having two steady states respectively corresponding to gate opening and gate closing states, a circuit for setting said flip-flop circuit to said gate opening state, and a circuit energized by said gate closing pulse to set said flip-flop circuit to said gate closing state.

3. A system for dividing a first number by a second number comprising a gate circuit; a pulse source connected to said gate circuit for applying pulses thereto, first and second predetermined counters having their inputs respectively connected to the output of said gate circuit to receive pulses simultaneously when said gate circuit is open; energizing means connecting the output of said second counter to said gate circuit; a pulse totalizer connected to the output of said first counter to count the pulses passing therefrom; reset means to reset said first and second counters and said totalizer to starting condition, said second counter being set to said first number and said first counter being set to said second number; means connected to said gate circuit for opening said gate circuit to allow pulses to pass therethrough, said gate circuit being closed and allowing no more pulses to pass therethrough when a single pulse appears at the output of said second counter and is applied by said energizing means to said gate circuit.

4. A system of dividing a first number by a second number comprising a gate circuit; a pulse source connected to said gate circuit for applying pulses thereto; a flip-flop circuit connected to said gate circuit for opening and closing said gate circuit; a means connected to said flip-flop circuit for applying a start pulse to said flip-flop circuit to open said gate circuit; first and second predetermined counters connected to said gate circuit to receive said pulses simultaneously when said gate circuit is open; said first predetermined counter being set to said second number and said second predetermined counter being set to said first number, the output of said second counter being connected to said flip-flop circuit; a totalizer connected to the output of said first counter to count the pulses passing thereby; said flip-flop circuit changing state and closing said gate circuit when a single pulse derived from said second counter is applied thereto.

5. A system as set forth in claim 4, further comprising a reset circuit connected to said counters and said totalizer to reset them to zero count condition before the division is to begin.

References Cited in the file of this patent

UNITED STATES PATENTS

| | | |
|---|---|---|
| 2,403,873 | Mumma | July 9, 1946 |
| 2,496,912 | Grosdoff | Feb. 7, 1950 |
| 2,558,447 | MacSorley | June 26, 1951 |
| 2,641,407 | Dickinson | June 9, 1953 |
| 2,769,595 | Bagley | Nov. 6, 1956 |
| 2,833,941 | Rosenberg et al. | May 6, 1958 |
| 2,853,235 | Bumster et al. | Sept. 23, 1958 |

FOREIGN PATENTS

| | | |
|---|---|---|
| 770,034 | Great Britain | Mar. 13, 1957 |